(12) United States Patent
Freer (10) Patent No.: US 12,466,288 B2
(45) Date of Patent: Nov. 11, 2025

(54) NESTED CONTROL LOOP STRUCTURE FOR HYBRID PROPULSION SYSTEM

(71) Applicant: Pratt & Whitney Canada Corp., Longueuil (CA)

(72) Inventor: Richard Freer, Saint-Basile-le-Grand (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 993 days.

(21) Appl. No.: 17/404,145

(22) Filed: Aug. 17, 2021

(65) Prior Publication Data

US 2023/0058484 A1 Feb. 23, 2023

(51) Int. Cl.
*B60L 58/13* (2019.01)
*B60L 15/20* (2006.01)
(Continued)

(52) U.S. Cl.
CPC .............. *B60L 58/13* (2019.02); *B60L 15/20* (2013.01); *B64C 27/54* (2013.01); *B64D 27/33* (2024.01); *B64D 27/35* (2024.01); *B64D 31/18* (2024.01); *B60L 2200/10* (2013.01); *B60L 2240/421* (2013.01); *B60L 2240/423* (2013.01); *B60L 2240/549* (2013.01); *B64D 27/026* (2024.01); *B64D 2221/00* (2013.01)

(58) Field of Classification Search
CPC ...... B60L 58/13; B60L 15/20; B60L 2200/10; B60L 2240/421; B60L 2240/423; B60L 2240/549; B64C 27/54; B64D 27/24; B64D 31/00; B64D 27/026; B64D 2221/00
See application file for complete search history.

(56) References Cited

U.S. PATENT DOCUMENTS 9,776,583 B2 10/2017 Edwards
10,501,194 B2 12/2019 Knapp et al.
(Continued)

FOREIGN PATENT DOCUMENTS

CA 3131251 A1 9/2020
EP 3823070 * 12/2019
(Continued)

OTHER PUBLICATIONS

European Patent Office, Communication re. extended European search report for European patent application No. 22190622.5, Jan. 19, 2023.

*Primary Examiner* — Aryan E Weisenfeld
(74) *Attorney, Agent, or Firm* — Norton Rose Fulbright Canada LLP (57) ABSTRACT

In accordance with at least one aspect of the present disclosure, there is provided a method for controlling power in an aircraft. The method includes, monitoring an electric energy storage module electrically connected to an electrical bus for an exceedance of a first current limit and monitoring a generator module connected to the electrical bus for an exceedance of a second current limit. If the current limit of either of the electric energy storage module or the generator module is exceeded by a predetermined exceedance amount, the method includes reducing a power consumption for an electric machine by a predetermined bias until the exceedance of the electrical energy storage and the exceedance of the generator module are both less than or equal to zero.

12 Claims, 2 Drawing Sheets

(51) Int. Cl.
    *B64C 27/54*      (2006.01)
    *B64D 27/33*      (2024.01)
    *B64D 27/35*      (2024.01)
    *B64D 31/18*      (2024.01)
    *B64D 27/02*      (2006.01)

(56) References Cited

U.S. PATENT DOCUMENTS

2016/0340051 A1   11/2016  Edwards
2018/0079515 A1*  3/2018  Harwood ............. B64D 27/359
2020/0290742 A1   9/2020  Kumar et al.

FOREIGN PATENT DOCUMENTS

EP       3823070 A1   5/2021
FR       3072652 A1   4/2019

* cited by examiner

NESTED CONTROL LOOP STRUCTURE FOR HYBRID PROPULSION SYSTEM

TECHNICAL FIELD

The present disclosure generally relates to power systems, and more particularly to, power systems for hybrid electric propulsions systems.

BACKGROUND

There is always a need in the art for improvements to power management in the aerospace industry.

SUMMARY

In accordance with at least one aspect of this disclosure, there is provided a method for controlling an electric machine of an aircraft. The method includes monitoring an electric energy storage module associated with the electric machine for an exceedance of a current limit associated with the electric energy storage module and monitoring a generator module associated with the electric machine for an exceedance of a current limit associated with the generator module. In embodiments, when one or both of the current limit associated with the electric energy storage module and the current limit associated with the generator module is exceeded by a respective exceedance amount, the method includes reducing a power consumption of the electric machine below a normal operating target by means of bias on a controller until the exceedance of the current limit associated with the electric energy storage and the exceedance of the current limit associated with the generator module reach a specified amount.

In embodiments, the method includes comparing the exceedance of the electric energy storage module and the exceedance of the generator module and selecting a more severe exceedance, and resuming the normal operating target of the electric machine when the summed exceedance is less than or equal to zero. In embodiments, the method includes adjusting a rotational speed target and torque of the electric machine based on a rotating speed target, a torque limit, and the rotating speed target at zero percent of exceedance limit.

In certain embodiments, adjusting the rotating speed and torque for the electric machine includes changing a pitch of variable pitch propeller blades in a propeller driven by the electric machine. In certain embodiments, the method can further include monitoring a generator module associated with the electric machine for an exceedance of a current limit associated with the electric machine. In certain embodiments, the method includes monitoring an electric energy storage module associated with the electric machine for an exceedance of a current limit associated with the electric energy storage module, associated with either the generator module or the electric machine, or associated with a generator controller and electric machine.

In accordance with another aspect of this disclosure, there is provided a method for controlling power in an aircraft. The method for controlling power includes, during operation of the aircraft, supplying electric energy from an electrical generator of the aircraft to an electric machine of the aircraft via an electrical bus of the aircraft, and during the operation of the aircraft, charging an electric energy storage module of the aircraft via the electrical bus by biasing the electrical generator to increase power output to the electrical bus. In embodiments, the method also includes, during the operation of the aircraft, powering the electric machine from the electric energy storage module by biasing the electrical generator to decrease power output to the electrical bus.

In embodiments, biasing the electrical generator to increase power output to the electrical bus to charge the electric energy storage module is based on charge feedback from an electric energy storage module management system. In certain embodiments, the method includes adding power from the electric energy storage module to the electrical bus when the electrical generator is limited by a maximum electrical generator current.

In certain embodiments, the method further includes, limiting power output from the electrical generator if an electric energy storage module recharge current limit occurs. In certain embodiments, the method further includes acquiring a state of charge controller target current value and an electric energy storage module recharge current limit, selecting a lower of the state of charge controller target current value of the state of charge target and the electric energy storage module recharge current limit as a value A1, summing total electric machine current and A1 into a summing result, selecting a lower value of a generator current limit and the summing result as a value A2, and controlling generator current based on V2 and a measurement of an actual electrical generator current.

In certain embodiments, the method can also include determining a electrical generator torque set point based on a electrical generator current control output and a electrical generator torque limit, and controlling torque of the electrical generator based on the electrical generator torque set point and a measurement of actual electrical generator torque.

In accordance with yet another aspect of this disclosure, there is provided an aircraft electric control system. In certain embodiments, the aircraft electric control system includes a generator module electrically connected to supply power to an electrical bus, an electric energy storage module electrically connected to the electrical bus in electrical parallel with the generator module, an electric energy storage module management system operatively connected to the electric energy storage module and operable to monitor a charge level of the electric energy storage module, and a control module operatively connected to the electric energy storage module management system and to the generator module.

In certain embodiments, the control module includes machine readable instructions executable by a processor associated with the control module to cause the control module to control power supply to the electrical bus from the generator module and control power supply to and from the electrical bus to and from the electric energy storage module. In certain embodiments, controlling power supply to the electrical bus from the generator module includes supplying electric energy from the generator module to the electrical bus, biasing the generator module to increase power output to the electrical bus to charge the electric energy storage module, and biasing the generator module to decrease power output to the electrical bus to discharge the electric energy storage module.

In embodiments, the system includes an electrical generator electrically connected to the generator module, where biasing the generator module includes controlling at least one of a torque and a current of the electrical generator. In embodiments the generator module is or includes a controllable generator module connected to an electrical bus in parallel to a DC/DC converter, where the DC/DC converter is electrically connected to an electrical energy storage module. In certain embodiments, the DC/DC converter is electrically connected to power an aircraft electrical system. In certain embodiments, the DC/DC converter is operative to output 28V to the aircraft electrical system. In embodiments, an electric machine electrically connected to the electrical bus.

In certain embodiments, controlling power supply to the electrical bus includes modulating power supply from the electrical generator to and from the electric energy storage module and to the electric machine based on charge feedback from the electric energy storage module management system. In certain embodiments, the electric machine connects to the electrical bus through an inverter. In certain embodiments, the electric machine is a first electric machine and the inverter is a first inverter, such that the system includes a second electric machine connected to the electrical bus through a second inverter, wherein the second electric machine and the second inverter are connected in electrical parallel with the first electric machine and the first inverter.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
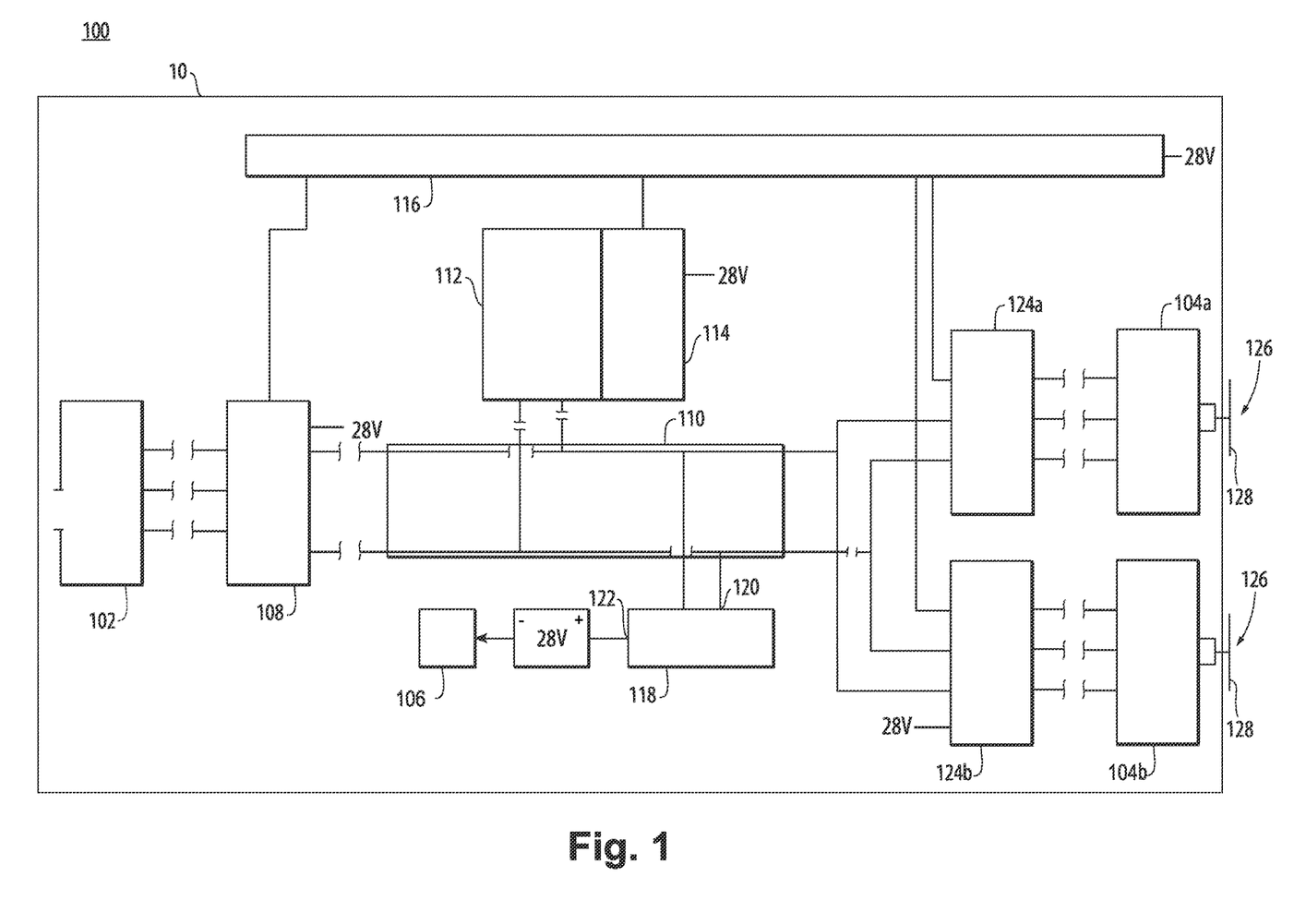
FIG. 1 is a schematic view of a system constructed in accordance with at least one aspect of this disclosure, showing an electrical power control system.
Figure 2:
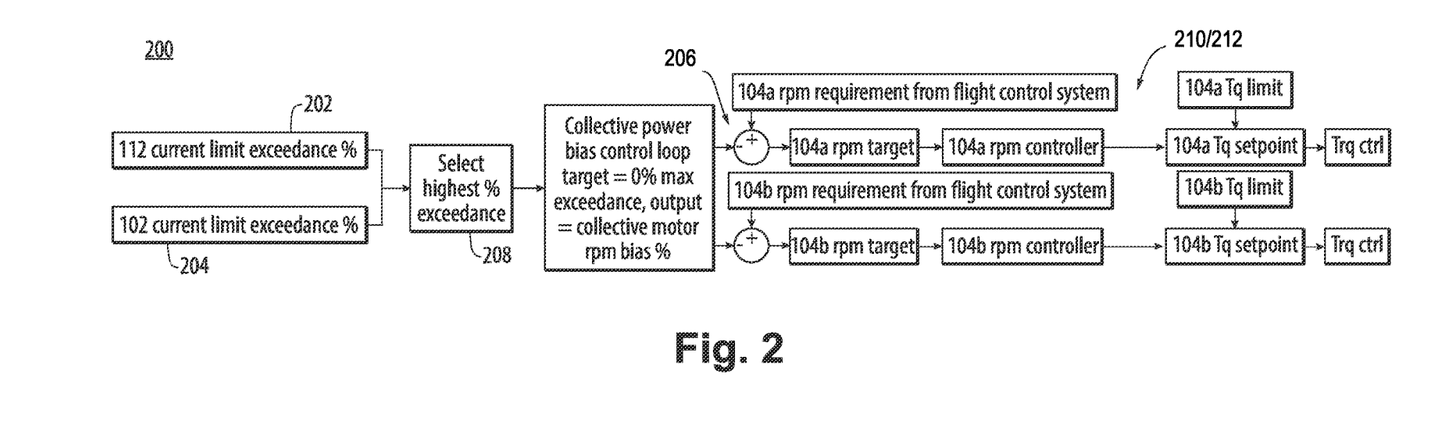
FIG. 2 is a schematic flow diagram of a control algorithm for controlling the control system of FIG. 1.
Figure 3:
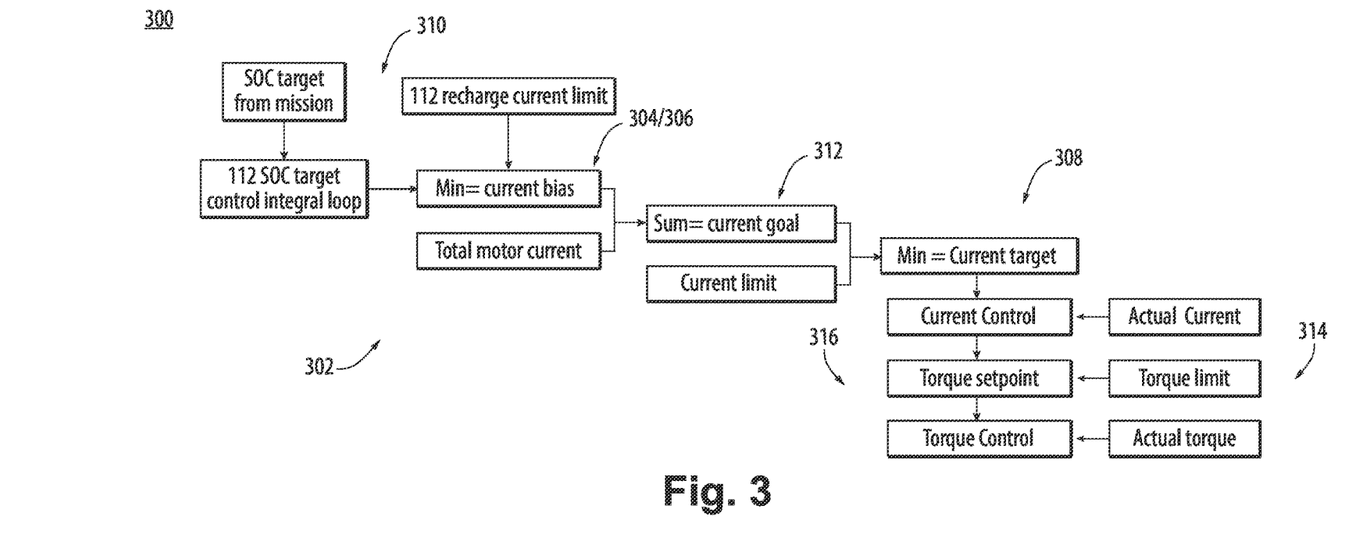
FIG. 3 is a schematic flow diagram of another control algorithm for controlling the control system of FIG. 1.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-3. Certain embodiments described herein can be used for enhanced power control in electric aircraft. The present disclosure is generally directed to power systems for aircraft systems, and more particularly to controlling power systems for hybrid-electric aircraft systems.

Parallel series and hybrid propulsion systems using distributed electric propulsion, have typically included a DC/DC converter for managing the current into and out of a battery. The same typically applies for single motor hybrid electric propulsions systems. Since the battery voltage varies depending on how much power is stored in the battery, the flow of current can sometimes flow into the battery when it is more important for the current to flow elsewhere. It is also possible to draw power from the battery when it is desired to preserve the charge level in the battery. However, there is an ongoing need for power systems that will provide improved control of current flowing into and out of the battery. This disclosure provides a solution for this need.

In accordance with at least one aspect of the present disclosure, there is provided an aircraft electric control system 100, for example for controlling power from a power supply 102 to at least one electric machine 104, and/or an aircraft electrical system 106. The electric machine 104 can be an electric motor for propulsion, for example, or an electric machine for any other suitable purpose. The system includes a generator module 108 (which can be or include at least one of a rectifier, AC/DC converter, and/or a generator controller) electrically connected to supply power from the power supply (e.g. an electrical generator 102) to an electrical bus 110. An electric energy storage module 112 is electrically connected to the electrical bus 110 in electrical parallel with the generator module 108. In embodiments, the electric energy storage module 112 and the generator module 108 can be electrically associated with the electric machine 104 via the electrical bus 110, where the association may be a permanent electrical association or may be a selective electrical association.

An electric energy storage module management system 114 is operatively connected to the electric energy storage module 112 and is operable to monitor charge level of the electric module 112. For example, the management system 114 can monitor the cell voltages, state of charge, current, temperature, and capacity history of the electric energy storage module 112, for example. In embodiments, the management system 114 can also contain overcurrent protection systems such as circuit breakers and fuses. In embodiments, metering or control of discharge current of the electric energy storage module can be managed by equipment such as the generator module 108 (as shown in FIG. 1 acting as an AC/DC converter) or motor controllers (e.g. a controller 116). In some embodiments, charge and discharge of the electric energy storage module 112 can be indirectly controlled by controller 116 by commanding either the generator 102 and/or the generator module 108. Charging currents can be managed by chargers (e.g. AC/DC or DC/DC convertors) or by motor inverters (e.g. inverters 124 if they are operating as generators). In certain embodiments, the electric energy storage module 112 is a battery, and the electric energy storage module management system 114 is a storage module management system, such as battery management system.

A control module 116 is operatively connected to the electric energy storage module management system 114 and to the generator module 108. The control module 116 includes machine readable instructions operative to control power supply to the electrical bus 110 from the generator module 108 (e.g. in this case acting as an AC/DC converter) and to control power supply to and from the electrical bus 110 to and from the electric energy storage module 112. In embodiment, the control module operates continuous control of the adjustable power generating device(s), and in certain embodiments, multiple controllable power sources attached in parallel to the DC Bus 110. In embodiments, the controller 116 can be or include both hard wired circuits that cause a logic to be executed, and/or software-based components, for example, simple electric circuits employing analogue components, or the controller 116 can include a CPU, a memory, machine readable instructions in the memory that when executed cause the CPU to perform a method (e.g. as described below with respect to methods 200, 300).

In embodiments, controlling power supply to the electrical bus 110 from the generator module 108 can first include supplying electrical energy from the generator module 108 to the electrical bus 110 and biasing the generator module 108 to increase power output to the electrical bus 110 to charge the electric energy storage module 112. Controlling the power supply can also include biasing the generator module 108 to decrease power output to the electrical bus 110 to discharge the electric energy storage module 112 (e.g. by powering the at least one electric machine 104 and/or the at least one electrical system 106 with the electric energy storage module 112, rather than, or in addition to the generator module 108). In embodiments, the electrical generator 102 is electrically connected to supply power to the electrical bus 110 through the generator module 108, such that biasing the generator module 108 includes controlling at least one of a torque and a current of the electrical generator 102. In some embodiments, it is contemplated that a generator and generator module can control the speed of said generator in order to achieve the desired current.

In certain embodiments, a DC/DC converter 118 is connected to the electrical bus 110 in electrical parallel with the generator module 108 via a DC input 120, and is electrically connected to power at least one aircraft electrical system 106 via a DC output 122. In certain such embodiments, the DC/DC converter 118 can be operative to output 28V to the at least one aircraft electrical system 106.

The electric machine 104 is electrically connected to the electrical bus 110 through an inverter 124 such that controlling of power supply to the electrical bus 110 includes modulating power supply from the electrical generator 102 to and from the electric energy storage module 112 and to the electric machine 104 based on charge feedback from the electric energy storage module management system 114. As used herein, charge feedback can include state of charge, level of charge, charge current, and or electric energy storage module temperature, and the like.

In certain embodiments, the electric machine 104 is a first electric machine 104a and the inverter is a first inverter 124a, and a second electric machine 104b is connected to the electrical bus 110 through a second inverter 124b. In certain such embodiments, the second electric machine 104b and the second inverter 124b are connected in electrical parallel with the first electric machine 104a and the first inverter 124b.

As shown in FIG. 2, in accordance with at least one aspect of the present disclosure, there is provided a method 200 for controlling power in an aircraft 10, e.g. using system 100 of FIG. 1. The method includes, monitoring 202 the electric energy storage module 112 (labeled in FIG. 1) for an exceedance of a first current limit and monitoring 204 the generator module 108 for an exceedance of a second current limit. Because the generator module 108 can include both the generator and a rectifier, the second current limit will be the lower of the generator current limit and the rectifier current limit.

If the current limit of either of the electric energy storage module 112 or the generator module 108 is exceeded by a predetermined exceedance amount, the method includes reducing 206 a rotational speed target (e.g. to reduce power consumption) for at least one of the electric machines 104a, 104b by a predetermined bias until the exceedance of the electric energy storage module 112 and the exceedance of the generator module 108 both reach a specified amount. In embodiments, the specified amount can be approaching zero, equal to zero, or less than zero (e.g. a target value such as zero, or a target value that can be a positive value or a negative value). In certain embodiments, the exceedance limit and bias amount can be a static predetermined exceedance limit and/or bias, or can be a dynamically determined exceedance limit and/or bias during operation. For example, the exceedance limit and/or bias can be determined by a predictive logic module (e.g. a proportional-integral-derivative logic module, a proportional-integral logic module, and/or a feed-forward look-up table). In certain embodiments, for example where the electric machines 104a, 104b operate normally at different rotational speeds or powers, the bias could be expressed as a percentage of nominal rpm or nominal power, or as a percentage of actual rpm or actual power.

In certain embodiments, (e.g. for vertical takeoff and landing aircraft) for example where lifting propellers are driven by electric machines 104a, 104b, the method includes reducing 206 the rotational speed target for at least one of the electric machines 104a, 104b by a predetermined bias can include even reduction 206, so as to avoid causing undesirable pitch, roll or yaw movements. Having a collective power bias (e.g. as shown in FIG. 2) can assist in maintaining direction & attitude control while limiting overall power. In certain embodiments, the targets for each electric machine 104a, 104b may be determined by algorithms that are more complex than the collective bias as described, which uses the same % rpm bias on all electric machines. While some embodiments may include the use of described feedback and/or predictive elements, some embodiments may use more complex, model-based software for determining collective bias. This software could be developed using modeling or empirical data. In embodiments, the algorithm could be constructed using the functionality as described above in addition to known general engineering principles as applied to the specific characteristics of each particular power system and method to which the technology of the present disclosure is applied.

In embodiments, the method includes monitoring the energy storage module current and the generator module current and dividing these by their respective current limits to calculate current limit ratio. As used herein, percent exceedance means the percentage above 100% for the calculated current limit ratio. The amount of the exceedance can be expressed as a percentage or a ratio of each respective limit so that the exceedance of the storage module 112 current limit and the exceedance of the generator module 108 current limit can be compared on equal terms, since they are both in terms of a ratio or percent scale. In embodiments, the method includes comparing 208 the percent exceedance of each of the generator module 108 and the electric energy storage module 112 and selects the higher of the two values. This selected highest value is then used to calculate a collective power bias by means of a pre-programmed relationship between collective power and rpm to calculate an rpm bias that should be applied to all electric machines 104 to reduce the actual percent exceedance of each module 108, 112 to a desired specified value, such as zero or a negative exceedance value to ensure some margin. The rpm bias can be applied to the rpm target which is ultimately communicated to each electric machine 104a, 104b by a flight control system (e.g. flight control computer), for example.

When the percent exceedance of both the modules 108, 112 are both less than or equal to zero, normal operating targets for the electric machines 104a, 104b (e.g. rotation speed targets) can be calculated. As used herein, a "normal operating target" means the typical operating target for a given application for a given aircraft, for example as determined by a pilot, flight control system, and/or mission control system. In certain embodiments, the rotational speed of the electric machines 104a, 104b is not reduced in the event of the exceedance of the electric energy storage module 112 or the exceedance of the generator module 108.

In embodiments, the method includes adjusting 212 rotating speed (e.g. power consumption) and torque for the at least one electric machine 104a, 104b, based on a requirement from the flight control system (e.g. rotating speed limit, a torque limit, and the rotating speed target at zero percent of exceedance limit), but with an adjustment or a bias determined by a collective power bias control loop. In embodiments, the control loop seeks to adjust the electric machine 104 power to ensure that the current limits for modules 108 and 112 are both respected, for example, so that both modules 108, 112 have a current exceedance of zero or less. In certain embodiments, adjusting power consumption can be accomplished by adjusting a rotating speed target, or by adjusting motor torque target or by adjusting the pitch of variable pitch propeller blades 128 in a propeller 126 driven by the at least one electric machine 104a, 104b. In the example shown in FIG. 2, the same percent bias can be applied to all electric machines 104, which in certain instances may avoid undesirable loss of control of attitude yaw or roll (e.g. in the case of a multi-rotor vertical take-off or landing aircraft). Applying a percent bias could also avoid undesirable yaw or pitch or roll for aircraft that have vertical lift propellers of different sizes or power ratings. In certain embodiments, it may also be possible to apply a different bias to each electric machine 104 if the aircraft is designed in such as way that this would be necessary to maintain pitch/yaw/roll control when total power is limited.

As shown in FIG. 3, and in accordance with yet another aspect of this disclosure, there is provided another embodiment of a method 300 for controlling power in the aircraft 10 using the system 100. The method includes supplying 302 electrical energy from the electrical generator 102 to the at least one electric machine 104a, 104b and the electric energy storage module 112, through the electrical bus 110 so that the electric energy storage module 112 does not add power to the electrical bus 110. For example, during operation of the aircraft 10, the method includes supplying electric energy from the electrical generator 102 to the electric machine 104a, 104b via electrical bus 110 and charging the electric energy storage module 112 via the electrical bus 110 by biasing the electrical generator 102 to increase power output to the electrical bus 110. In embodiments, the method includes powering the electric machine 104a, 104b from the electric energy storage module 112 by biasing the electrical generator 102 to decrease power output to the electrical bus 110.

The method includes biasing 304 the electrical generator 102 to increase power output to the electrical bus 110 to charge the electric energy storage module 110, and biasing 306 the electrical generator 102 to decrease power output to the electrical bus 110 to discharge the electric energy storage module 112 based on charge feedback from the electric energy storage module management system 114.

In embodiments, the method 300 (e.g. an electric energy storage module state of charge control loop) includes adding power from the electric energy storage module 112 to the electrical bus 110 when the electrical generator 110 is limited by a maximum electrical generator current. In embodiments, the method 300 includes limiting 308 power output from the generator 102 if an electric energy storage module recharge current limit is reached.

The method 300 further includes acquiring 310 a state of charge target (e.g. provided by a pilot, flight control system, mission control system) and an electric energy storage module recharge current limit, where a minimum recharge current limit represents an electrical generator current bias, and selecting a lower voltage value one of the state of charge target and the electric energy storage module recharge current limit as a value A2.

The state of charge (SOC) control loop can be an integral control loop that monitors the actual current of the electric energy storage module 112 and provides a modified target current value that can be either higher or lower than the actual value. The SOC control loop target current can then be compared to the electric energy storage module 112 recharge current limit and the lowest of the two values is used.

Where a state of charge target control loop will set an electric energy storage module 112 current target A1 that is compared with the electric energy storage module 112 recharge current limit A2 and the lower of the two current values is selected to be the generator current bias value 304/306 that is added to the sum 302 of the currents of all the motors on the DC bus (e.g. to determine the generator current target 312). The generator current target 312 can then be compared to the known generator current limit 308 and the lower of 312 and 308 is chosen as the limited generator current target 314. The generator control system seeks to achieve the limited generator current target 314 value while monitoring the actual generator current, by determining a generator torque set point 316.

While the methods 200 and 300 are shown and described separately, it should be understood that the methods 200 and 300 can be used simultaneously, and in concert with one another, to control power within the system 100 as described. However, it is also contemplated that in certain embodiments, each method 200 and 300 can be used independently, and asynchronously to control power within the system 100 or within a portion of the system 100. Any other suitable combination of system 100 and methods 200 and 300 is contemplated herein.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure. For example, the following particular embodiments of the present technology are likewise contemplated, as described herein next by clauses.

Clause 1. A method (200) for controlling an electric machine (104) of an aircraft (10), comprising:
- monitoring (202) an electric energy storage module (112) associated with the electric machine for an exceedance of a current limit associated with the electric energy storage module;
- monitoring (204) a generator module (108) associated with the electric machine for an exceedance of a current limit associated with the generator module; and
- when one or both of the current limit associated with the electric energy storage module and the current limit associated with the generator module is exceeded by a respective exceedance amount,
- reducing (206) a power consumption of the electric machine below a normal operating target by means of bias on a controller (116) until the exceedance of the current limit associated with the electric energy storage and the exceedance of the current limit associated with the generator module reach a specified amount.

Clause 2. The method as recited in clause 1, further comprising:
- comparing (208) the exceedance of the electric energy storage module and the exceedance of the generator module and selecting a more severe exceedance; and
- resuming (212) the normal operating target of the electric machine when the summed exceedance is less than or equal to zero.

Clause 3. The method as recited in clause 2, further comprising, adjusting (210) rotational speed and torque of the electric machine based on a rotating speed target, a torque limit, and the rotating speed target at zero percent of exceedance limit.

Clause 4. The method as recited in clause 3, wherein adjusting the rotating speed and torque for the electric machine includes changing a pitch of variable pitch propeller blades (128) in a propeller (126) driven by the electric machine.

Clause 5. The method as recited in clause 4, further comprising:
- monitoring a generator module (108) associated with the electric machine for an exceedance of a current limit associated with the electric machine.

Clause 6. A method (300) for controlling power in an aircraft (10), comprising:
- during operation of the aircraft, supplying (302) electric energy from an electrical generator (102) of the aircraft to an electric machine (104) of the aircraft via an electrical bus (110) of the aircraft;
- during the operation of the aircraft, charging (302) an electric energy storage module (112) of the aircraft via the electrical bus by biasing (304) the electrical generator to increase power output to the electrical bus; and
- during the operation of the aircraft, powering (302) the electric machine from the electric energy storage module by biasing the electrical generator to decrease power output to the electrical bus.

Clause 7. The method as recited in claim 6, further comprising, wherein biasing the electrical generator to increase power output to the electrical bus to charge the electric energy storage module is based on charge feedback from an electric energy storage module management system (114).

Clause 8. The method as recited in claim 7, further comprising, adding (306) power from the electric energy storage module to the electrical bus when the electrical generator is limited by a maximum electrical generator current.

Clause 9. The method as recited in clause 7, further comprising limiting (308) power output from the electrical generator if an electric energy storage module recharge current limit occurs.

Clause 10. The method as recited in clause 9, further comprising,
- acquiring (310) a state of charge controller target current value and an electric energy storage module recharge current limit;
- selecting (312) a lower of the state of charge controller target current value of the state of charge target and the electric energy storage module recharge current limit as a value A1;
- summing (314) total electric machine current and A1 into a summing result;
- selecting a lower value of a generator current limit and the summing result as a value A2; and
- controlling generator current based on A2 and a measurement of an actual electrical generator current.

Clause 11. The method are recited in clause 10, further comprising:
- determining (316) a electrical generator torque set point based on a electrical generator current control output and a electrical generator torque limit.

Clause 12. The method as recited in clause 11, further comprising:
- controlling torque of the electrical generator based on the electrical generator torque set point and a measurement of actual electrical generator torque.

Clause 13. An aircraft electric control system, comprising:
- a generator module (108) electrically connected to supply power to an electrical bus (110);
- an electric energy storage module (112) electrically connected to the electrical bus in electrical parallel with the generator module;
- an electric energy storage module management system (114) operatively connected to the electric energy storage module and operable to monitor a charge level of the electric energy storage module;
- a control module (116) operatively connected to the electric energy storage module management system and to the generator module, wherein the control module includes machine readable instructions executable by a processor associated with the control module to cause the control module to:
  - control power supply to the electrical bus from the generator module; and
  - control power supply to and from the electrical bus to and from the electric energy storage module,
- wherein the controlling power supply to the electrical bus from the generator module includes:
  - supplying electric energy from the generator module to the electrical bus,
  - biasing the generator module to increase power output to the electrical bus to charge the electric energy storage module; and
  - biasing the generator module to decrease power output to the electrical bus to discharge the electric energy storage module.

Clause 14. The system as recited in clause 13, further comprising, an electrical generator (102) electrically connected to the generator module, wherein biasing the generator module includes controlling at least one of a torque and a current of the electrical generator.

Clause 15. The system as recited in clause 14, wherein the generator module is a controllable generator module connected to the electrical bus in parallel to a DC/DC converter (118), wherein the DC/DC converter is electrically connected to the electrical energy storage module.

Clause 16. The system as recited in clause 15, wherein the DC/DC converter is electrically connected to power an aircraft electrical system (106).

Clause 17. The system as recited in clause 16, wherein the DC/DC converter is operative to output 28V to the aircraft electrical system.

Clause 18. The system as recited in clause 19, further comprising an electric machine (104) electrically connected to the electrical bus.

Clause 19. The system as recited in clause 18, wherein controlling power supply to the electrical bus includes modulating power supply from the electrical generator to and from the electric energy storage module and to the electric machine based on charge feedback from the electric energy storage module management system.

Clause 20. The system as recited in clause 18, wherein the electric machine connects to the electrical bus through an inverter (124).

Clause 21. The system as recited in clause 20, wherein the electric machine is a first electric machine (104*a*) and the inverter is a first inverter (124*b*), and further comprising:
a second electric machine (104*b*) connected to the electrical bus through a second inverter (124*b*), wherein the second electric machine and the second inverter are connected in electrical parallel with the first electric machine and the first inverter.

Clause 22. The system as recited in any one of clauses 13-21, wherein the electric energy storage module is a battery, wherein the electric energy storage module management system is a battery management system, and wherein at least one of the first and or second electric machines is an electric motor.

What is claimed is:

1. A method for controlling power in an aircraft, comprising, during operation of the aircraft:
supplying electric energy from an electrical generator of the aircraft to an electric machine of the aircraft via an electrical bus of the aircraft; and
charging an electric energy storage module of the aircraft via the electrical bus by biasing the electrical generator to increase power output to the electrical bus based on charge feedback from an electric energy storage module management system, and limiting power output from the electrical generator if an electric energy storage module recharge current limit occurs, including:
acquiring a state of charge controller target current value and an electric energy storage module recharge current limit;
selecting a lower of the state of charge controller target current value and the electric energy storage module recharge current limit as a value A1;
summing total electric machine current and A1 into a summing result;
selecting a lower value of a generator current limit and the summing result as a value A2; and
controlling generator current based on A2 and a measurement of an actual electrical generator current.

2. The method as recited in claim 1, further comprising, adding power from the electric energy storage module to the electrical bus when the electrical generator is limited by a maximum electrical generator current.

3. The method as recited in claim 1, further comprising:
determining a electrical generator torque set point based on a electrical generator current control output and a electrical generator torque limit.

4. The method as recited in claim 3, further comprising:
controlling torque of the electrical generator based on the electrical generator torque set point and a measurement of actual electrical generator torque.

5. An aircraft electric control system, comprising:
an electrical generator electrically connected to supply power to an electrical bus;
an electric energy storage module electrically connected to the electrical bus in electrical parallel with the electrical generator;
a management system operatively connected to the electric energy storage module and operable to monitor a charge level of the electric energy storage module;
a controller operatively connected to the management system and to the electrical generator, wherein the controller includes machine readable instructions executable by a processor associated with the controller to cause the controller to:
control power supply to the electrical bus from the electrical generator; and
control power supply to and from the electrical bus to and from the electric energy storage module,
wherein the controlling power supply to the electrical bus from the electrical generator includes:
supplying electric energy from the electrical generator to an electric machine via the electrical bus; and
charging the electric energy storage module of via the electrical bus by biasing the electrical generator to increase power output to the electrical bus based on charge feedback from the management system, and limiting power output from the electrical generator if an electric energy storage module recharge current limit occurs, including:
acquiring a state of charge controller target current value and an electric energy storage module recharge current limit;
selecting a lower of the state of charge controller target current value and the electric energy storage module recharge current limit as a value A1;
summing total electric machine current and A1 into a summing result;
selecting a lower value of a generator current limit and the summing result as a value A2; and
controlling generator current based on A2 and a measurement of an actual electrical generator current.

6. The system as recited in claim 5, wherein biasing the electrical generator includes controlling at least one of a torque and a current of the electrical generator.

7. The system as recited in claim 6, wherein the electrical generator is connected to the electrical bus in parallel to a DC/DC converter, wherein the DC/DC converter is electrically connected to the electrical energy storage module.

8. The system as recited in claim 7, wherein the DC/DC converter is electrically connected to power an aircraft electrical system.

9. The system as recited in claim 8, wherein the DC/DC converter is operative to output 28V to the aircraft electrical system.

10. The system as recited in claim 5, wherein the electric machine is a first electric machine connected to the electrical bus through a first inverter, and further comprising:
a second electric machine connected to the electrical bus through a second inverter, wherein the second electric machine and the second inverter are connected in electrical parallel with the first electric machine and the first inverter.

11. The method as recited in claim 1, further comprising powering the electric machine from the electric energy storage module by biasing the electrical generator to decrease power output to the electrical bus.

12. The system as recited in claim 5, wherein the controller is further configured to power the electric machine from the electric energy storage module by biasing the electrical generator to decrease power output to the electrical bus.

* * * * *